United States Patent
Matylitski (10) Patent No.: US 11,099,915 B2
(45) Date of Patent: *Aug. 24, 2021

(54) OPTIMIZING STARTUP TIME FOR EVENT-DRIVEN FUNCTIONS

(71) Applicant: Amazon Technologies, Inc., Seattle, WA (US)

(72) Inventor: Ivan Matylitski, Dublin (IE)

(73) Assignee: Amazon Technologies, Inc., Seattle, WA (US)

( * ) Notice: Subject to any disclaimer, the term of this patent is extended or adjusted under 35 U.S.C. 154(b) by 33 days.

This patent is subject to a terminal disclaimer.

(21) Appl. No.: 16/510,747

(22) Filed: Jul. 12, 2019

(65) Prior Publication Data

US 2020/0012544 A1 Jan. 9, 2020

Related U.S. Application Data

(63) Continuation of application No. 15/473,374, filed on Mar. 29, 2017, now Pat. No. 10,353,753.

(51) Int. Cl.
*G06F 9/44* (2018.01)
*G06F 9/54* (2006.01)

(52) U.S. Cl.
CPC .............. *G06F 9/542* (2013.01); *G06F 9/546* (2013.01)

(58) Field of Classification Search
CPC ....................................................... G06F 9/542
USPC ........................................................ 719/318
See application file for complete search history.

(56) References Cited

U.S. PATENT DOCUMENTS

| 9,032,199 B1 | 5/2015 | Dibble |
| 10,353,753 B1 | 7/2019 | Matylitski |
| 2008/0046696 A1 | 2/2008 | Vertes |

*Primary Examiner* — Timothy A Mudrick
(74) *Attorney, Agent, or Firm* — Robert C. Kowert; Kowert, Hood, Munyon, Rankin & Goetzel, P.C.

(57) ABSTRACT

An event-driven compute service generates a checkpoint package based on an initialized state of a function. The checkpoint package may be generated through proactive or reactive checkpointing. The checkpoint package includes function code and checkpoint data for an initialized state of the registered function. The event-driven compute service registers the checkpoint package. In response to a determination that an event matches a defined event to trigger the registered checkpoint package, the registered checkpoint package launches in a container. A checkpoint framework causes the container to launch the registered function from the initialized state according to the checkpoint data of the registered checkpoint package. The container terminates the registered function upon completion of one or more tasks.

20 Claims, 9 Drawing Sheets

OPTIMIZING STARTUP TIME FOR EVENT-DRIVEN FUNCTIONS

This application is a continuation of U.S. patent application Ser. No. 15/473,374, filed Mar. 29, 2017, which is hereby incorporated by reference herein in its entirety.

BACKGROUND

Many of today's computer applications are capable of performing certain tasks in response to events (e.g., receiving user input or receiving input from another device). Certain types of computer applications can be implemented by remote service providers and can be used by multiple clients from different locations. For example, a remote service provider may offer an "event-driven" service that a client may use to configure an application or a particular function to run at the remote service provider whenever a particular event occurs. For example, a particular function may execute whenever the application receives information from a web page that was filled out by a user, and another function may execute whenever a new row is added to a particular database table maintained by the service provider.

When a function begins execution, the function may need to execute for a certain amount of time (e.g., startup time) before the function arrives at an initialized state to begin processing input or begin performing other tasks. For example, if a particular function is launched (e.g., begins execution) by a computer in response to input data that is received from a website, then the computer may need to spend a certain amount of startup time to perform certain operations or tasks that prepare the execution environment for the function (e.g., allocating memory, loading supporting libraries, etc.) before the function can begin to process the input data. If functions are launched numerous times within a relatively short time period, then significant delays may result and application performance may suffer. For example, a surge in website use for a particular application may reduce the performance and the response time as the application incurs additional delays when launching functions to process a surge in input data.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

The systems and methods described herein implement optimized startup time for event-driven functions of a provider network. In embodiments, an event-driven compute service may generate a checkpoint package based on initialized state of a function. In various embodiments, the event-driven compute service may generate the checkpoint package through "proactive" checkpointing or "reactive" checkpointing.

To proactively generate a checkpoint package for a function, a service of the provider network or another service may begin building the function and upon determining that the function has arrived at an initialized state, the service may proactively generate the checkpoint package. The process of proactively generating a checkpoint package is described for FIG. 6.

To reactively generate a checkpoint package for a function, an event-driven compute service of the provider network may first register a function. In some embodiments, the function may be registered in response to a request from a user. In response to a determination that an event matches a defined event to trigger the registered function, the registered function launches from an uninitialized state in a container. In embodiments, an event may match a defined event if one or more portions of the event (or one or more portions of data associated with the event) map to one or more portions of the defined event (or one or more portions of data of the defined event). An event may include receiving data, sending data, and/or any other occurrence that may be detected by the event-driven compute service and/or the provider network and suitable for comparison to a defined event to determine if there is a matching or mapping. In some embodiments, as part of registering the function, one or more defined events may be assigned to the function that trigger the function and cause the function to launch. As used herein, "launching" a function is executing a function (or code of the function), so that the function is an actively running function. In embodiments, the container includes a checkpoint framework. The checkpoint framework may determine to generate a checkpoint package for the registered function while the registered function is executing. In some embodiments, to determine to reactively generate the checkpoint package for the registered function, the checkpoint framework may receive a call from checkpoint code of the registered function. The reactively generated checkpoint package may include function code, an entry point, supporting code, and/or checkpoint data for an initialized state of the registered function.

After generation of the checkpoint package (e.g., through either proactive checkpointing or reactive checkpointing, as described above) the event-driven compute service may then register the checkpoint package. In some embodiments, the checkpoint package may be registered in response to a request from a user. After the checkpoint package is registered, certain events may cause the registered checkpoint package to trigger and/or launch. For example, in response to a determination that another event matches another defined event to trigger the registered checkpoint package, the registered checkpoint package may launch in another container. In some embodiments, the other container may include another checkpoint framework.

In embodiments, the other checkpoint framework may cause the other container to launch the registered function from the initialized state according to the checkpoint data of the registered checkpoint package. In some embodiments, the other checkpoint framework may receive a call from an entry point of the registered checkpoint package and in response, the other checkpoint framework causes the other container to launch the registered function from the initialized state as specified by the entry point. In embodiments, the entry point may include agent code that specifies the call (e.g., via an API call) to the checkpoint framework. The other container may terminate the registered function upon completion of one or more tasks responsive to the other event.

In some embodiments, a client of the event-driven compute service, a client device, or a source of the event (e.g., an application or other source) is unaware of aspects of the event-driven compute service and/or how the event-driven compute service is implemented. For example, to implement the registered function or the registered checkpoint package, the event-driven compute service may execute code on one or more computing devices of the provider network, wherein the client, client device, or event source is unaware of the identity and/or network address of the one or more computing devices. Thus, in embodiments, the registered function, the registered checkpoint package, and/or other code may be executed in response to events, without a client having to manage, own, or run a fleet of dedicated servers to execute code on.

Thus, in various aspects, use of the event-driven compute service enables a "server-less" service. Without the use of the event-driven compute service, a client that needs to establish and use functions and/or checkpoint packages as described herein may need to manage its own fleet of servers to listen to events, as well as manage identities and security credentials for the fleet of servers in order to accept and/or authenticate client devices to establish connections. However, as described herein, embodiments may allow a client to use an event-driven compute service to listen for and respond to a large number of events without the requirement for additional server infrastructure that needs to be managed by the client.

As the number of events increases, the benefits of using checkpoint packages for functions increase. For example, by registering checkpoint packages, registered functions can be started up faster because registered functions can be launched from an initialized state instead of being launched from an uninitialized state. Thus, the provider network may consume fewer computing resources (CPU processing, memory, storage, network bandwidth), reducing the cost of implementing event-driven functions to respond to events. Moreover, one or more tasks responsive to a given event may be completed faster, resulting in a lower response time for client devices of the event-driven compute service.

Moreover, embodiments allow a client to reduce or eliminate the need to own or manage servers dedicated to responding to events. A given registered function and/or a given registered checkpoint package may only be active and executing when responding to a triggering event. Thus, when not responding to an event, the event-driven compute service may not be required to consume computing resources (CPU processing, memory, storage, network bandwidth), which may reduce the cost of using the service for clients as well as the service provider. Therefore, various embodiments provide ways for clients to reduce cost, reduce network delays and traffic, reduce communication errors, and reduce the amount of computing infrastructure/devices required to implement event-driven functions.

Figure 1:
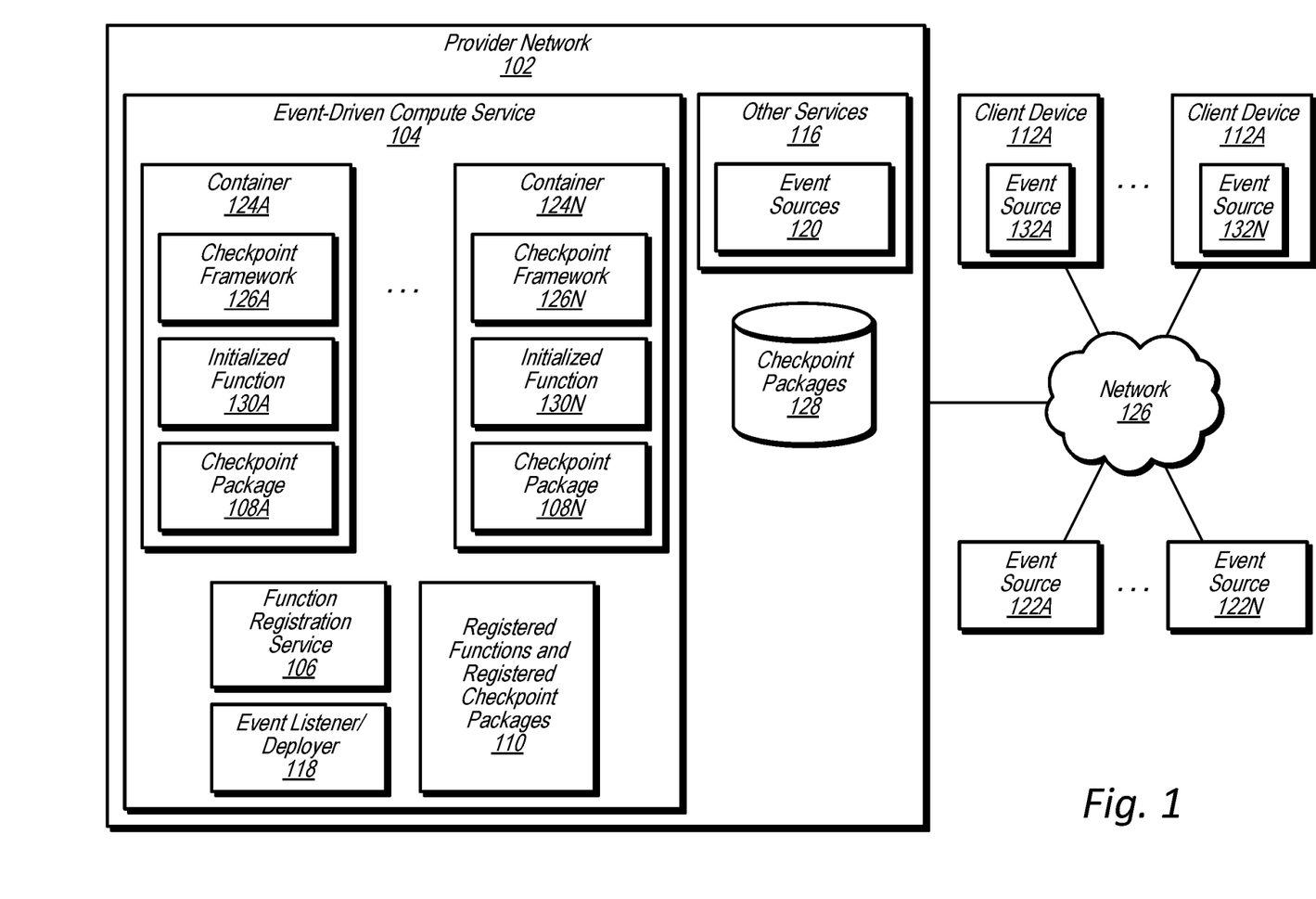
FIG. 1 illustrates a system for providing optimized startup time for event-driven functions, according to some embodiments.

FIG. 1 illustrates a system for providing optimized startup time for event-driven functions, according to some embodiments. In embodiments, the provider network 102 depicted in FIG. 1 may be the same type of provider network, and include some or all of the components as other provider networks depicted in FIGS. 1-6.

In the depicted embodiment, the provider network 102 includes an event-driven compute service 104 for one or more clients. In embodiments, the event-driven compute service 104 may register (e.g., via a function registration service 106) one or more functions or checkpoint packages 108 in the event-driven compute service 104. In some embodiments, the event-driven compute service 104 may store or maintain a list 110 or other data indicating the registered functions and checkpoint packages of one or more clients of the event-driven compute service 104. For example, a given client may register a function or a checkpoint package 108 using a client device 112 of the client that is external to the provider network 102 (e.g., via a user interface and/or an application programming interface (API)). In the depicted embodiment, the client devices 112a-112n communicate with the provider network 102 via a network 114 (e.g., wide-area network, the Internet, etc.).

In some embodiments, a given client may register a function or checkpoint package 108 using a client device or another service 116 that is within the provider network 102 (e.g., via a user interface and/or an API. For example, a client may register a function or a checkpoint package 108 using a software application running on a compute instance and/or computing device within the provider network 102. As used herein, any actions performed by a client or other user may be performed via an external client device or by a client device or service as described above, or via any other suitable technique.

In embodiments, to register a function or a checkpoint package 108, the event-driven compute service 104 defines one or more events that will trigger the function or the checkpoint package 108. In embodiments, an event may be any input, activity, or other event that is detectable by the event-driven compute service 104 and that may be used to trigger a function or a checkpoint package 108. In the depicted embodiment, an event listener/deployer 118 of the event-driven compute service 104 may receive and/or detect one or more of the events described herein. The event listener/deployer 118 may also determine whether the received and/or detected event matches a defined event to trigger a registered function or a registered checkpoint package.

In embodiments, a given event may originate at and/or may be received from an event source within the provider network 102 (e.g., event source 120) or an event source 122 external to the provider network 102 (e.g., event source 122 or event source 132 of a client device 112). In embodiments, an event source within the provider network 102 or external to the provider network may be any computing device, software application, or other suitable event source. In some embodiments, the event sources 122 may communicate with the provider network 102 via the network 114.

In response to a determination, by the event listener/deployer 118, that an event matches a defined event to trigger a particular function, the event-driven compute service 104 may launch the function from an uninitialized state in the container 124. In embodiments, the container may include a checkpoint framework 126. In some embodiments, the checkpoint framework 126 may generate a checkpoint package for the function while the function is executing. In embodiments, checkpoint packages may be maintained and/or stored at one or more locations within the event-driven compute service and/or the provider network 102, such as in the checkpoint packages 128 data store. A process for generating a checkpoint package is described in more detail for FIG. 2.

The above description of registering a function and launching the registered function to generate a checkpoint package is an example of reactive checkpointing. In some embodiments, proactive checkpointing may be used to generate the checkpoint package. As described in more detail below for FIG. 6, to proactively generate a checkpoint package for a function, the event-driven compute service may begin building the function and upon determining that the function has arrived at an initialized state, the event-driven compute service (e.g., a checkpoint framework) may generate the checkpoint package. Thus, in embodiments, a checkpoint package may be generated for a function through proactive checkpointng, even though the function may or may not be registered in the event-driven compute service 104.

As described above, the event-driven compute service 104 may register a checkpoint package 108a (e.g., via the registration service 106) and add the registered checkpoint package 108a to a list 110 of registered functions and checkpoint packages. In response to a determination, by the event listener/deployer 118, that another event matches another defined event to trigger the checkpoint package 108a, the event-driven compute service 104 may launch the checkpoint package 108a in another container 124a (in some cases, the container may be the same as the one described above for the uninitialized function). The other container 124a may include another checkpoint framework 126a.

In embodiments, the other checkpoint framework 126a may cause the other container 124a to launch the registered function from the initialized state (e.g., initialized function 130a) according to the checkpoint data of the checkpoint package 108a. Therefore, the other container 124a may avoid execution of the registered function in the uninitialized state or from the uninitialized state. For example, a startup time for the registered function when launching the registered checkpoint package may be less than another startup time for the registered function when launching the registered function in the uninitialized state or from the uninitialized state.

In some embodiments, the other checkpoint framework 126a may receive a call from an entry point of the checkpoint package 108a and in response, the checkpoint framework 126a may cause the other container 124a to launch the registered function from the initialized state according to the checkpoint data of the registered checkpoint package. In some embodiments, the other checkpoint framework 126a may determine, based on identification data for the registered checkpoint package, that the registered function is to be launched from the initialized state and in response, cause the other container to launch the registered function from the initialized state according to the checkpoint data of the registered checkpoint package.

In embodiments, the other container 124a may terminate the function upon completion of one or more tasks responsive to the other event (reducing computing resource usage, as described above). In some embodiments, the event-driven compute service does not guarantee that any execution state of the registered function is saved when the registered function is terminated.

In embodiments, a number of containers 124a-124n may be launched. A given container may be an execution environment capable of executing a registered function or a registered checkpoint package 108. For example, one or more of the containers 124 may include a java virtual machine capable of executing a registered function or a registered checkpoint package. In embodiments, one or more of the containers may be any other execution environment capable of executing a registered function or a registered checkpoint package. In embodiments, the checkpoint framework is a component of the container (e.g., a component of the execution environment). As used herein, "launching" a container is executing, building, installing and/or a container (or code and/or components of the container), so that the container is an actively running execution environment. In embodiments, launching a container may also include sending the container (or code and/or components of the container) to a host that will execute, build, and/or install the container on the host.

In some embodiments, the event-driven compute service 104 may include any number of different containers (e.g., execution environments) that may be used to execute any number of different registered functions or registered checkpoint packages. Thus, in embodiments, the specific language used for a function or checkpoint package may not be a limiting factor for a client.

In embodiments, each of the containers may implement an operating system or components of an operating system that provide functionality to generate a checkpoint package for a function and/or to launch the function from an initialized state, based on the checkpoint package. For example, various Linux-based operating systems may include components that provide the functionality required to generate at least some or all of the components of a checkpoint package. Thus, an operating system may have built-in functionality that stores a function's processing state, including the state of computing system resources such as memory mapping, open files, task context, and open sockets. In embodiments, a checkpoint package may include the state of one or more of the above computing system resources, and/or the state of one or more other computing system resources as needed to allow a function to launch from an initialized state.

In embodiments, the registered functions and registered checkpoint packages 110 may store a unique identifier within the event-driven compute service 104 for each corresponding registered function and registered checkpoint package. Additional data may also be stored for each corresponding registered function and registered checkpoint package, such as defined events that trigger a registered function or registered checkpoint package. In embodiments, the registered functions and registered checkpoint packages 110 may include a table, list, or any other data structure suitable for storing data associated with the registered functions and registered checkpoint packages.

In the depicted embodiment, the event listener/deployer 118 listens for events that trigger registered functions and registered checkpoint packages. Thus, the event listener/deployer 118 may include data that describes the triggering events or has access to data that describes the triggering events. In some embodiments, actions performed by the event-driven compute service 104, including actions by the event listener/deployer 118 or any other components, may be performed by the same service/software module and/or hardware or any other combination of services/software modules and/or hardware of the event-driven compute service.

Figure 2:
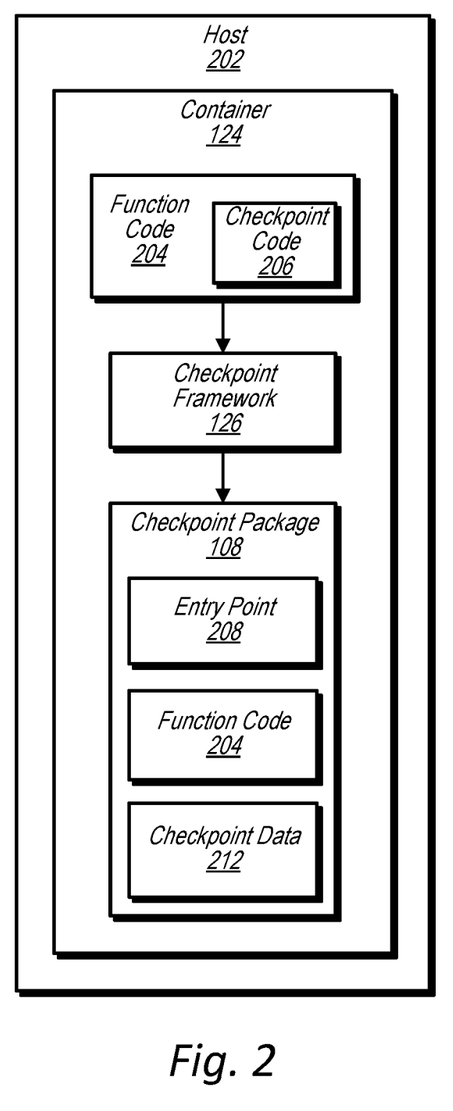
FIG. 2 illustrates a system and a process for implementing a checkpoint framework to generate a checkpoint package for an event-driven compute service of a provider network, according to some embodiments.

FIG. 2 illustrates a system and a process for implementing a checkpoint framework to generate a checkpoint package for an event-driven compute service of a provider network, according to some embodiments. The depicted example may be a technique for reactive checkpointing, in embodiments. In the depicted example, a host 202 includes the container 124, which is one of the containers 124 of the event-driven compute service 204. In embodiments, the host 202 may launch the container 124, as described below for FIGS. 4A and 4B.

In the depicted embodiment, the container 124 includes function code 204 for a function. In response to a determination, by the event listener/deployer 118, that an event matches a defined event to trigger the function, the container 124 may launch the function from an uninitialized state in the container 124. For example, in response to a determination, by the event listener/deployer 118, that an event matches a defined event to trigger the function, the event listener/deployer 118 may send to the container 124 an indication or instruction to launch the function from an uninitialized state.

In embodiments, the container may include a checkpoint framework 126. In some embodiments, the checkpoint framework 126 may determine to generate a checkpoint package 108 for the function while the function is executing and in response, it may generate the checkpoint package 108. In embodiments, the function code 204 includes checkpoint code 206. While the function is executing, the checkpoint framework 126 may receive a call from the checkpoint code 206 to generate the checkpoint package and in response, the checkpoint framework 126 may determine to generate the checkpoint package 108 for the function. In embodiments, the container 124 may terminate the function upon completion, by the function, of one or more tasks responsive to the event (reducing computing resource usage, as described above).

As depicted, the checkpoint package 108 may include an entry point 208, the function code 204, and checkpoint data 212. In some embodiments, the checkpoint package 108 may include additional data required for the function to launch in an initialized state (e.g., supporting code/libraries, etc.). As described below for FIG. 3, the event-driven compute service 104 may use the contents of the checkpoint package 108 to launch the function in an initialized state according to the checkpoint data 212 of the checkpoint package 108.

Figure 3:
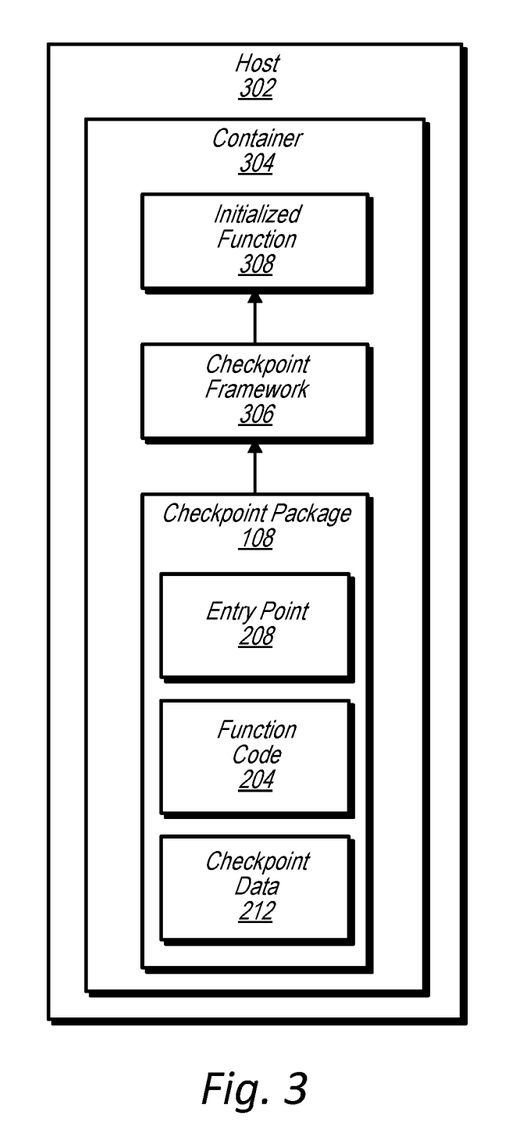
FIG. 3 illustrates a system and a process for implementing a checkpoint framework to cause a container to launch a registered function from an initialized state in an event-driven compute service of a provider network, according to some embodiments.

FIG. 3 illustrates a system and a process for implementing a checkpoint framework to cause a container to launch a registered function from an initialized state in an event-driven compute service of a provider network, according to some embodiments. In the depicted example, the host 302 includes a container 304. In the depicted embodiment, the container 304 is one of the containers 124 of the event-driven compute service 204. Also, the host 302 and the container 304 are different than the host 202 and container 124 of FIG. 3 (in some cases, the host and/or container may be the same). In embodiments, the host 302 may launch the container 304, as described below for FIGS. 4A and 4B.

In embodiments, in response to a determination, by the event listener/deployer 118, that an event matches a defined event to trigger the registered checkpoint package 108, the event-driven compute service 104 may launch the registered checkpoint package 108 in the container 304. The checkpoint package 108 may have been previously generated by another host and another container, such as the host 202 and the container 124 of FIG. 2, and subsequently registered as the registered checkpoint package 108.

In some embodiments, the checkpoint framework 306 may cause the container 304 to launch the function from the initialized state (e.g., initialized function 308) according to the checkpoint data 212 of the checkpoint package 108. In some embodiments, the checkpoint framework 306 may receive a call from the entry point 208 of the checkpoint package 108 and in response, the checkpoint framework 306 may cause the container 304 to launch the function from the initialized state. In embodiments, the container 304 may terminate the function upon completion, by the function, of one or more tasks responsive to the event (reducing computing resource usage, as described above).

Figure 4A:
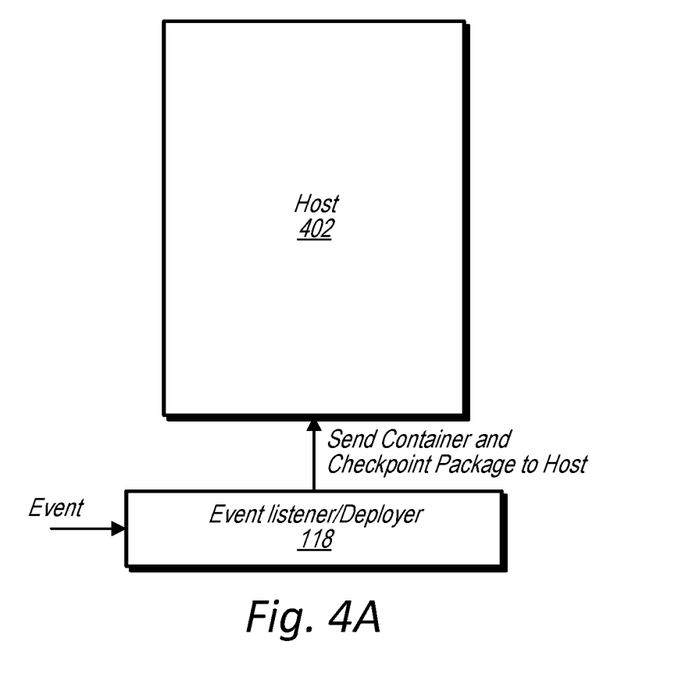
FIG. 4A is a block diagram illustrating an example host for an event-driven compute service that receives a container and checkpoint package in response to an event, according to some embodiments.

FIG. 4A is a block diagram illustrating an example host for an event-driven compute service that receives a container and checkpoint package in response to an event, according to some embodiments. In the depicted embodiment, in response to a determination, by an event listener/deployer 118 that an event matches a defined event to trigger a checkpoint package 108, the event listener/deployer 118 sends (or causes the event-driven compute service 104 to send) a container 124 and the checkpoint package 108 to a selected host 402 of the event-driven compute service 104.

In embodiments, one or more criteria may be used to select the host (from multiple hosts) to send the container 124 and the checkpoint package 108 to. Examples of the criteria are: a resource utilization of the host being less than one or more other hosts, performance of the host of the selected container being above (or above by at least a threshold value) performance of one or more other hosts, network traffic to and/or from the host being below (or below by at least a threshold value) network traffic to and/or from one or more other hosts, storage space (e.g., for storing the container and/or the checkpoint package) on the host exceeding (or exceeding by a threshold value) storage space on one or more other hosts, and random selection. Any other suitable method for the host from multiple hosts of the event-driven compute service 104 may be implemented.

Figure 4B:
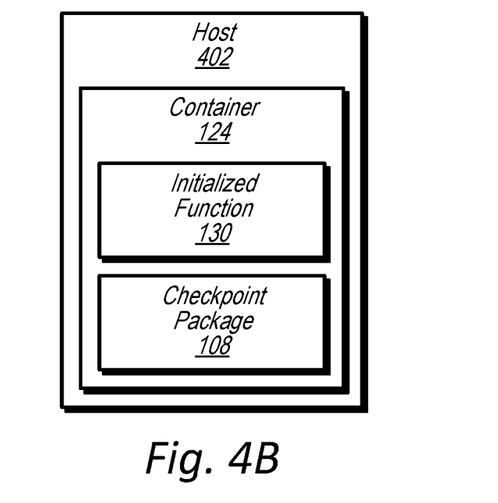
FIG. 4B is a block diagram illustrating an example host for an event-driven compute service that launches a container, a registered checkpoint package, and a registered function in an initialized state, according to some embodiments.

FIG. 4B is a block diagram illustrating an example host for an event-driven compute service that launches a container, a registered checkpoint package, and a registered function in an initialized state, according to some embodiments. In the depicted example, the host 402 is the same host of FIG. 4A.

In embodiments, in response to receiving the container 124 and the checkpoint package 108, the host 402 launches the container 124. In response to launching the container, the host 402 may launch the checkpoint package. In embodiments, in response to launching the container, a checkpoint framework causes the container to launch the function from the initialized state (e.g., initialized function 130) according to the checkpoint data of the checkpoint package 124. In embodiments, the function corresponds to the function code included in the checkpoint package 124. In embodiments, the container 124 may terminate the function upon completion of one or more tasks responsive to the other event (reducing computing resource usage, as described above).

Figure 4C:
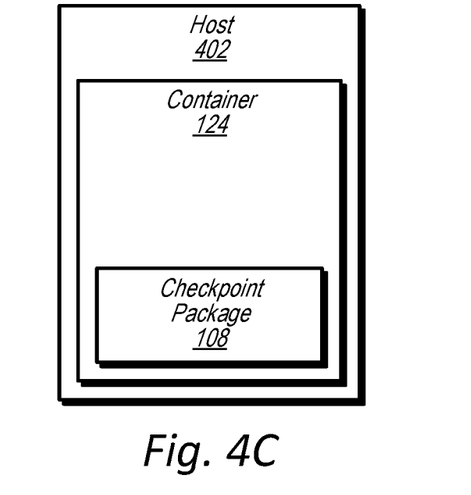
FIG. 4C is a block diagram illustrating an example host in an event-driven compute service that terminates a registered function upon completion of one or more tasks responsive to an event, according to some embodiments.

FIG. 4C is a block diagram illustrating an example host in an event-driven compute service that terminates a registered function upon completion of one or more tasks responsive to an event, according to some embodiments. In the depicted example, the host 402 is the same host of FIG. 4A.

In the depicted example, the function that was executing in the container 124 terminated after completing one or more tasks. In embodiments, the container 124 terminates the function upon completion of one or more tasks responsive to the event described in FIG. 4A. Therefore, the container 124 is not currently executing any registered functions or registered checkpoint packages. However, in embodiments, the container 124 and the checkpoint package 108 are saved and/or maintained by the host. In some embodiments, the container 124 is "frozen" and/or put into a suspended state such that it is not consuming any computing (e.g., CPU) resources.

In some embodiments, a dedicated persistent storage may store and persist the container 124 and the checkpoint package 108 in between launches or executions of the registered checkpoint package 108. For example, the data may be persisted even though a container may be frozen or otherwise not consuming compute resources for a period of time. In embodiments, the data may be persisted through a re-boot of a host of the container and through a failure of the host of the container. In various embodiments, the dedicated persistent storage includes one or more of solid state storage, hard disk, RAM, ROM, system memory, and any other suitable type of persistent storage, including types of storage described herein (e.g., volatile and/or non-volatile).

Figure 4D:
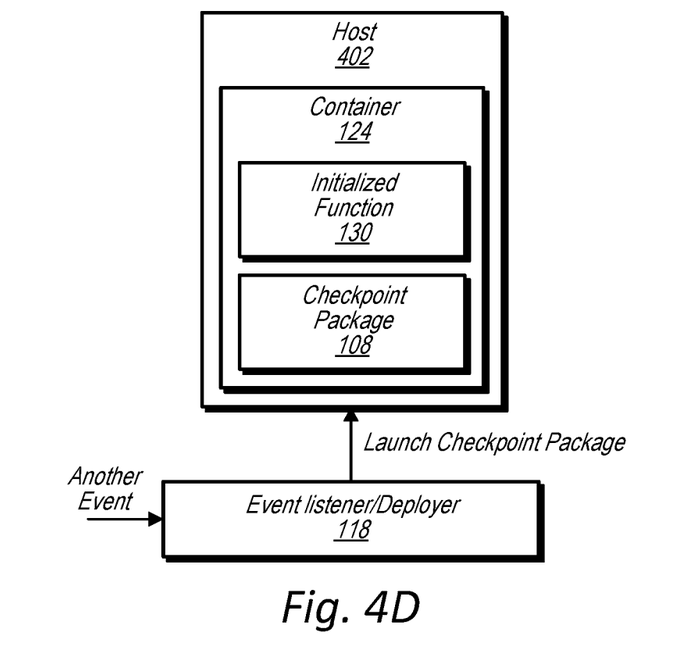
FIG. 4D is a block diagram illustrating an example host for an event-driven compute service that launches a registered function in an initialized state in a pre-existing container, according to some embodiments.

FIG. 4D is a block diagram illustrating an example host for an event-driven compute service that launches a registered function in an initialized state in a pre-existing container, according to some embodiments. In the depicted example, the host 402 is the same host of FIG. 4A.

In the depicted example, in response to a determination, by the event listener/deployer 118, that another event matches a defined event to trigger the checkpoint package 108, the event-driven compute service 104 "thaws" and/or activates the container 124 so that it is no longer in a suspended state. The container 124 may then launch the checkpoint package 108. Thus, in embodiments, the same container 124 may be re-used to respond to subsequent events that trigger the checkpoint package 108.

In embodiments, the checkpoint framework of the container 124 may cause the container 124 to launch the function from the initialized state (e.g., initialized function 130) according to the checkpoint data of the checkpoint package 108. The function may correspond to the function code included in the checkpoint package 124. In embodiments, the container 124 may terminate the function upon completion of one or more tasks responsive to the other event (reducing computing resource usage, as described above).

Figure 5:
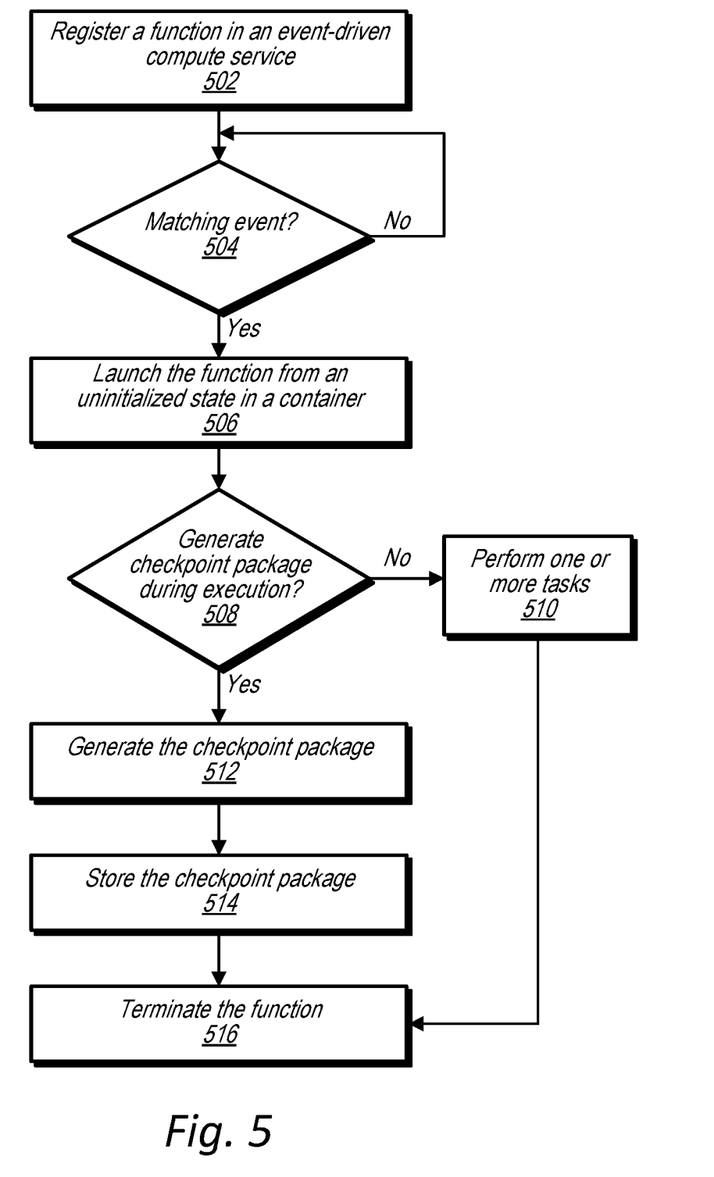
FIG. 5 is a flow diagram of a process for generating a checkpoint package reactively, using a registered function of an event-driven compute service, according to some embodiments.

FIG. 5 is a flow diagram of a process for generating a checkpoint package reactively, using a registered function of an event-driven compute service, according to some embodiments. One or more portions of the illustrated process may be performed via one or more components of an event-driven compute service and/or other components of a provider network, such as provider network 102. In embodiments, the depicted example is a technique for reactive checkpointing.

At block 502, an event-driven compute service registers a function in the event-driven compute service (e.g., via a registration service). At block 504, the event-driven compute service determines whether an event matches a defined event to trigger the registered function. If not, the process remains at block 504. If the event-driven compute service determines that an event matches a defined event to trigger the registered function, then at block 506, the event-driven compute service launches the registered function from an uninitialized state in a container. In some instances, the container may be launched before launching the registered function. Thus, the description in FIGS. 4A-4D for launching a registered checkpoint package may also apply for launching a registered function, in embodiments.

At block 508, a checkpoint framework determines whether to generate a checkpoint package for the registered function. If not, at block 510, the function performs one or more tasks (e.g., responsive to the event) and then terminates at block 516. In some embodiments, the checkpoint framework may determine to generate a checkpoint package for the registered function in response to determining that one or more initialization tasks of the registered function are complete. In some embodiments, the checkpoint framework may determine to generate a checkpoint package for the registered function in response to receiving a call from checkpoint code of the registered function, as described above.

If the checkpoint framework determines to generate a checkpoint package for the registered function, then at block 512, the checkpoint framework generates the checkpoint package for the registered function. At block 514, the checkpoint framework may store the checkpoint package in one or more locations. At step 516, the container may terminate the registered function upon completion of one or more tasks responsive to the event.

Figure 6:
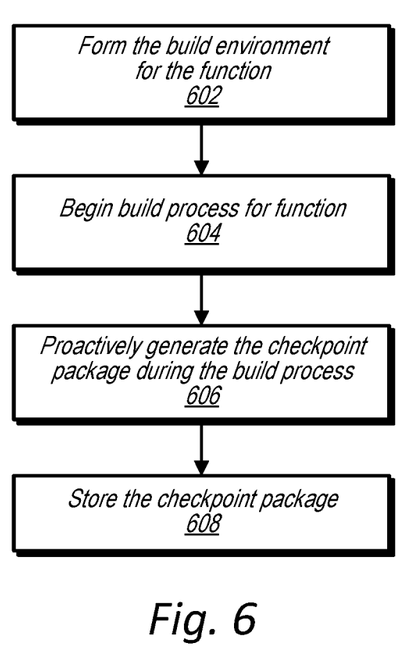
FIG. 6 is a flow diagram of a process for generating a checkpoint package proactively during a build process, according to some embodiments.

FIG. 6 is a flow diagram of a process for generating a checkpoint package proactively during a build process, according to some embodiments. One or more portions of the illustrated process may be performed via one or more components of a provider network, such as provider network 102. For example, a component of the event-driven compute service 104 (e.g., a container 124 and/or checkpoint framework 126) or another service 116 of the provider network may perform one or more portions of the illustrated process. In some embodiments, a service external to the provider network 102 may perform one or more portions of the illustrated process, and send the generated checkpoint package to the provider network 102 for registration and/or storage (e.g., in checkpoint packages 128). In embodiments, the depicted example is a technique for proactive checkpointing.

At block 602, the event-driven compute service 104 forms the build environment for the function. This may include any suitable steps to form a build environment, such as building an execution environment for the function, loading supporting code libraries, code closure, etc. At block 604, the event-driven compute service 104 begins the build process for the function. In embodiments, the process of building the function includes executing the function from an uninitialized state and/or performing one or more initialization tasks during execution of the function.

At block 606, the event-driven compute service 104 proactively generates a checkpoint package for the function, during (or after) the build process. To proactively generate the checkpoint package, the event-driven compute service 104 may determine that the function has arrived at an initialized state and in response, generate the checkpoint package. For example, during the building of the function, the event-driven compute service 104 may determine that one or more of initialization tasks have been performed such that the function has arrived in an initialized state and in response, generate the checkpoint package.

At block 608, the event-driven compute service 104 stores the checkpoint package. In embodiments, the event-driven compute service 104 may store the checkpoint package within the event-driven compute service 104 and/or another location of the provider network 102 (e.g., checkpoint packages 128).

Figure 7:
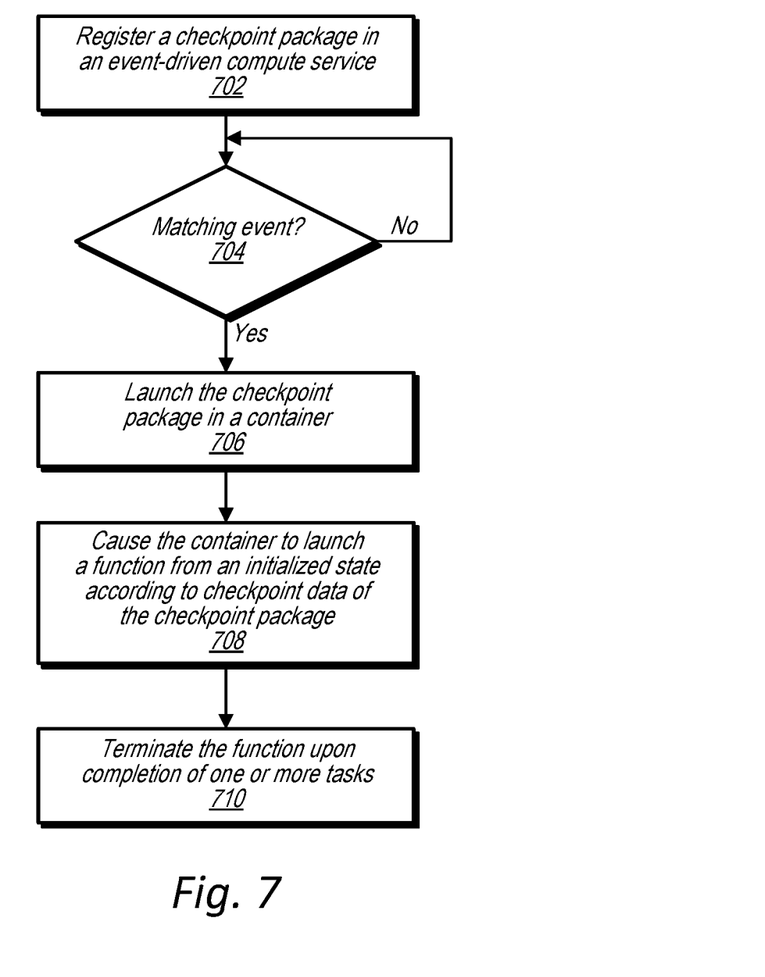
FIG. 7 is a flow diagram of a process for launching a registered function of an event-driven compute service from an initialized state according to checkpoint data of a registered checkpoint package, according to some embodiments.

FIG. 7 is a flow diagram of a process for launching a registered function of an event-driven compute service from an initialized state according to checkpoint data of a registered checkpoint package, according to some embodiments. One or more portions of the illustrated process may be performed via one or more components of an event-driven compute service and/or other components of a provider network, such as provider network 102.

At block 702, an event-driven compute service registers a checkpoint package in an event-driven compute service. At block 704, the event-driven compute service determines whether an event matches a defined event to trigger the registered checkpoint package. If not, the process remains at block 704. If the event-driven compute service determines that an event matches a defined event to trigger the registered checkpoint package, then at block 706, the event-driven compute service launches the registered checkpoint package in a container. As described above, in some instances, the container may be launched before launching the registered checkpoint package.

At block 708, a checkpoint framework of the container causes the container to launch a registered function from an initialized state according to checkpoint data of the registered checkpoint package. At step 710, the container may terminate the registered function upon completion of one or more tasks responsive to the event.

Figure 8:
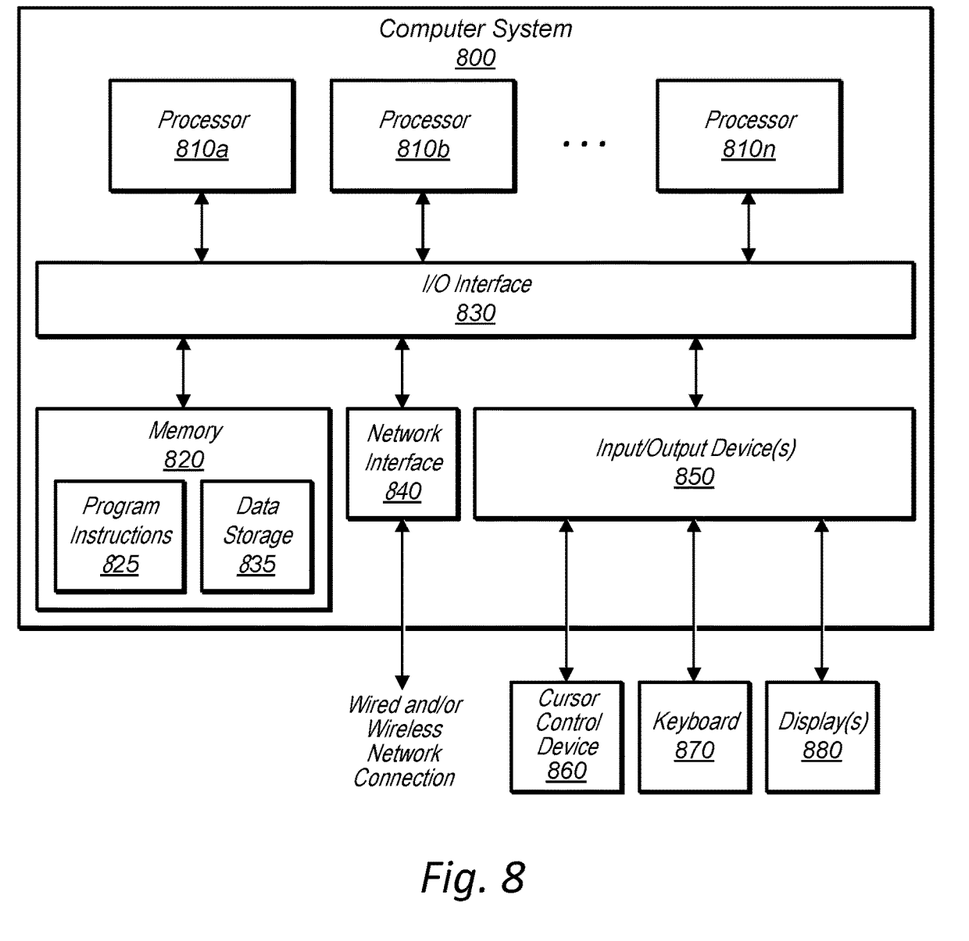
FIG. 8 is a block diagram illustrating an example computer system that implements some or all of the techniques described herein, according to some embodiments.

Any of various computer systems may be configured to implement processes associated with implementing optimized startup time for event-driven functions. For example, FIG. 8 is a block diagram illustrating one embodiment of a computer system suitable for implementing some or all of the techniques described herein. For example, the one or more of the computer systems may host one or more respective containers. In some cases, a host computer system may host multiple containers. In various embodiments, the provider network may include one or more computer systems 800 such as that illustrated in FIG. 8 or one or more components of the computer system 800 that function in a same or similar way as described for the computer system 800.

In the illustrated embodiment, computer system 800 includes one or more processors 810 coupled to a system memory 820 via an input/output (I/O) interface 830. Computer system 800 further includes a network interface 840 coupled to I/O interface 830. In some embodiments, computer system 800 may be illustrative of servers implementing enterprise logic or downloadable application, while in other embodiments servers may include more, fewer, or different elements than computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be embedded processors implementing any of a variety of instruction set architectures (ISAs), such as the x106, PowerPC, SPARC, or MIPS ISAs, or any other suitable ISA. In multiprocessor systems, each of processors 810 may commonly, but not necessarily, implement the same ISA.

System memory 820 may be configured to store instructions and data accessible by processor 810. In various embodiments, system memory 820 may be implemented using any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above for the downloadable software or provider network are shown stored within system memory 820 as program instructions 825. In some embodiments, system memory 820 may include data 835 which may be configured as described herein.

In one embodiment, I/O interface 830 may be configured to coordinate I/O traffic between processor 810, system memory 820 and any peripheral devices in the system, including through network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments, some or all of the functionality of I/O interface 830, such as an interface to system memory 820, may be incorporated directly into processor 810.

Network interface 840 may be configured to allow data to be exchanged between computer system 800 and other devices attached to a network, such as between a host of the event-driven compute service 104 and other computer systems, for example. In particular, network interface 840 may be configured to allow communication between computer system 800 and/or various I/O devices 850. I/O devices 850 may include scanning devices, display devices, input devices and/or other communication devices, as described herein. Network interface 840 may commonly support one or more wireless networking protocols (e.g., Wi-Fi/IEEE 802.7, or another wireless networking standard). However, in various embodiments, network interface 840 may support communication via any suitable wired or wireless general data networks, such as other types of Ethernet networks, for example. Additionally, network interface 840 may support communication via telecommunications/telephony networks such as analog voice networks or digital fiber communications networks, via storage area networks such as Fibre Channel SANs, or via any other suitable type of network and/or protocol.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 800 via I/O interface 830. A computer-readable storage medium may also include any volatile or non-volatile media such as RAM (e.g. SDRAM, DDR SDRAM, RDRAM, SRAM, etc.), ROM, etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

In some embodiments, I/O devices 850 may be relatively simple or "thin" client devices. For example, I/O devices 850 may be configured as dumb terminals with display, data entry and communications capabilities, but otherwise little computational functionality. However, in some embodiments, I/O devices 850 may be computer systems configured similarly to computer system 800, including one or more processors 810 and various other devices (though in some embodiments, a computer system 800 implementing an I/O device 850 may have somewhat different devices, or different classes of devices).

In various embodiments, I/O devices 850 (e.g., scanners or display devices and other communication devices) may include, but are not limited to, one or more of: handheld devices, devices worn by or attached to a person, and devices integrated into or mounted on any mobile or fixed equipment, according to various embodiments. I/O devices 850 may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 800. In general, an I/O device 850 (e.g., cursor control device, keyboard, or display(s) may be any device that can communicate with elements of computing system 800.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of the data transfer tool, various services, databases, devices and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A system, comprising:
one or more processors; and
one or more memories, wherein the one or more memories have stored thereon instructions, which when executed by the one or more processors, cause the one or more processors to implement an event-driven compute service, wherein the event-driven compute service is configured to:
determine that an event matches a defined event for a function of the event-driven compute service, wherein the function comprises function code;
execute the function from an uninitialized state in response to a determination that the event matches the defined event, wherein the execution of the function comprises execution of at least a portion of the function code;
while the function is executing, generate a checkpoint package for the function, wherein the checkpoint package comprises the function code of the function and checkpoint data for an initialized state of the function; and
subsequent to the generation of the checkpoint package for the initialized state of the function, complete the execution of the function, wherein the function is terminated upon completion, by the function, of one or more tasks responsive to the event that triggered the function.

2. The system as recited in claim 1, wherein the event-driven compute service is configured to:
determine that another event matches another defined event for the checkpoint package;
execute the checkpoint package in response to a determination that the other event matches the other defined event; and
cause the function to execute from the initialized state according to the checkpoint data;
wherein the function terminates upon completion, by the function, of one or more tasks.

3. The system as recited in claim 2, wherein the event-driven compute service is configured to:
execute the function from the uninitialized state on a host of the event-driven compute service; and execute the function from the initialized state according to the checkpoint data on another host of the event-driven compute service.

4. The system as recited in claim 3, wherein the event-driven compute service is configured to perform one or more of:
after execution and termination of the function on the host, maintain the checkpoint package at the host, or
after execution and termination of the function on the other host, maintain the checkpoint package at the other host.

5. The system as recited in claim 1, wherein the event-driven compute service is configured to:
receive, by a checkpoint framework, a call from the function to generate the checkpoint package; and
in response, generate, by the checkpoint framework, the checkpoint package for the function.

6. The system as recited in claim 2, wherein the event-driven compute service is configured to:
receive, by a checkpoint framework, a call from an entry point of the checkpoint package to execute the function from the initialized state according to the checkpoint data; and
in response, cause the function to execute from the initialized state according to the checkpoint data.

7. The system as recited in claim 3, wherein the other host avoids execution of the function in the uninitialized state.

8. A method, comprising:
determining that an event matches a defined event for a function of an event-driven compute service, wherein the function comprises function code;
executing the function from an uninitialized state in response to a determination that the event matches the defined event, wherein the execution of the function comprises execution of at least a portion of the function code;
while the function is executing, generating a checkpoint package for the function, wherein the checkpoint package comprises the function code of the function and checkpoint data for an initialized state of the function; and
subsequent to the generation of the checkpoint package for the initialized state of the function, complete the execution of the function, wherein the function terminates upon completion, by the function, of one or more tasks responsive to the event that triggered the function.

9. The method as recited in claim 8, further comprising:
determining that another event matches another defined event for the checkpoint package;
executing the checkpoint package in response to a determination that the other event matches the other defined event; and
causing the function to execute from the initialized state according to the checkpoint data;
wherein the function terminates upon completion, by the function, of one or more tasks.

10. The method as recited in claim 9, further comprising:
executing the function from the uninitialized state on a host of the event-driven compute service; and
executing the function from the initialized state according to the checkpoint data on another host of the event-driven compute service.

11. The method as recited in claim 10, further comprising:
after execution and termination of the function on the host, maintaining the checkpoint package at the host, or
after execution and termination of the function on the other host, maintaining the checkpoint package at the other host.

12. The method as recited in claim 8, further comprising:
receiving, by a checkpoint framework, a call from the function to generate the checkpoint package; and
in response, generating, by the checkpoint framework, the checkpoint package for the function.

13. The method as recited in claim 9, further comprising:
receiving, by a checkpoint framework, a call from an entry point of the checkpoint package to execute the function from the initialized state according to the checkpoint data; and
in response, causing the function to execute from the initialized state according to the checkpoint data.

14. The method as recited in claim 10, wherein the other host avoids execution of the function in an uninitialized state.

15. One or more non-transitory computer-accessible storage media storing program instructions that when executed on or across one or more processors cause the one or more processors to implement an event-driven compute service to:
determine that an event matches a defined event for a function of the event-driven compute service, wherein the function comprises function code;
execute the function from an uninitialized state in response to a determination that the event matches the defined event, wherein the execution of the function comprises execution of at least a portion of the function code;
while the function is executing, generate a checkpoint package for the function, wherein the checkpoint package comprises the function code of the function and checkpoint data for an initialized state of the function; and
subsequent to the generation of the checkpoint package for the initialized state of the function, complete the execution of the function, wherein the function terminates upon completion, by the function, of one or more tasks responsive to the event that triggered the function.

16. The one or more storage media as recited in claim 15, further comprising program instructions that when executed on or across the one or more processors cause the one or more processors to:
determine that another event matches another defined event for the checkpoint package;
execute the checkpoint package in response to a determination that the other event matches the other defined event; and
cause the function to execute from the initialized state according to the checkpoint data;
wherein the function terminates upon completion, by the function, of one or more tasks.

17. The one or more storage media as recited in claim 16, further comprising program instructions that when executed on or across the one or more processors cause the one or more processors to:
execute the function from the uninitialized state on a host of the event-driven compute service; and
execute the function from the initialized state according to the checkpoint data on another host of the event-driven compute service.

18. The one or more storage media as recited in claim 17, further comprising program instructions that when executed on or across the one or more processors cause the one or more processors to:

after execution and termination of the function on the host, maintain the checkpoint package at the host, or after execution and termination of the function on the other host, maintain the checkpoint package at the other host.

19. The one or more storage media as recited in claim 15, further comprising program instructions that when executed on or across the one or more processors cause the one or more processors to:

receive, by a checkpoint framework, a call from the function to generate the checkpoint package; and in response, generate, by the checkpoint framework, the checkpoint package for the function.

20. The one or more storage media as recited in claim 17, wherein the other host avoids execution of the function in an uninitialized state.

* * * * *